Nov. 23, 1965 P. E. PRITCHARD 3,219,764

STYLUS ASSEMBLY FOR A PHONOGRAPH PICKUP CARTRIDGE

Filed March 31, 1960

Inventor:
Peter E. Pritchard,
by Norman C. Fulmer
His Attorney.

United States Patent Office 3,219,764
Patented Nov. 23, 1965

3,219,764
STYLUS ASSEMBLY FOR A PHONOGRAPH PICKUP CARTRIDGE

Peter E. Pritchard, Skaneateles, N.Y., assignor to General Electric Company, a corporation of New York Filed Mar. 31, 1960, Ser. No. 18,942
9 Claims. (Cl. 179—100.41)

This invention relates to stylus assemblies for use in phonograph pickup cartridges, and particularly to a stylus assembly that can be used advantageously with a stereophonic phonograph pickup cartridge of the magnetic type as disclosed in Patent No. 3,015,703, issued on January 2, 1962, of the same inventor and assigned to the same assignee as the present invention.

The operating requirements of a stylus assembly for use in a stereophonic magnetic type of phonograph pickup cartridge as referred to above, involve a number of complex factors, since such a stylus assembly functions as a part of the active magnetic circuit for converting the mechanical vibrations of a moving record groove into an electrical signal. Satisfactory functioning of such a stylus assembly requires that the moving parts thereof have suitable compliance, i.e., freedom of movement, in all directions in a plane lying perpendicular to the direction of the record groove at the point of contact of the stylus point with the record groove. At the same time, the moving parts must have a suitable restoring force applied thereto at all times to maintain the moving parts properly oriented with respect to a neutral position. Simultaneously with these requirements, the stylus assembly must be carefully designed so as to prevent the occurrence of undesired resonant vibrations, and furthermore it must be capable of vibrating, in accordance with the modulation of the record groove, with uniform ease and fidelity over a wide frequency range. Still further, the stylus assembly, when used for playing stereophonic records, must be capable of cooperating with the magnetic assembly of the pickup cartridge in a suitable manner to provide a high degree of magnetic and electrical separation between the stereophonic signal channels. It has been found that prior art design techniques have not been capable of producing an entirely satisfactory stylus assembly of the type desired.

Objects of the invention are to provide an improved stylus assembly having the desired characteristics of high compliance, high fidelity, good stability, a high degree of electrical and magnetic separation between stereophonic signal channels, and simplicity and economy of manufacture. Still other objects will be apparent from the following disclosure and claims, and from the drawing in which:

The stylus assembly of the invention, in its preferred embodiment, comprises a channel member of non-magnetic material, at least two support blocks of resilient material held in the channel in alignment along an axis, a crank-shaped armature of magnetically conductive material having an elongated arm extending through the support blocks on said axis, the crank-shaped armature having a crank portion extending in a lateral direction from the forward end of the elongated arm and further having an end portion extending forwardly from said crank portion, and a stylus point extending laterally from said end portion, the frontmost of the support blocks having a frontwardly extending shoulder spaced from and free from contact with the channel member and surrounding the elongated arm, said frontmost support block being made of a material that is relatively viscous as compared with the material of the rearmost block, and the rearmost block being made of a material that is relatively spring-like as compared with said material of the frontmost block. The channel member is provided with a post extending laterally therefrom, for attaching the stylus assembly to a phonograph pickup cartridge.

Figures 1, 2, 3:
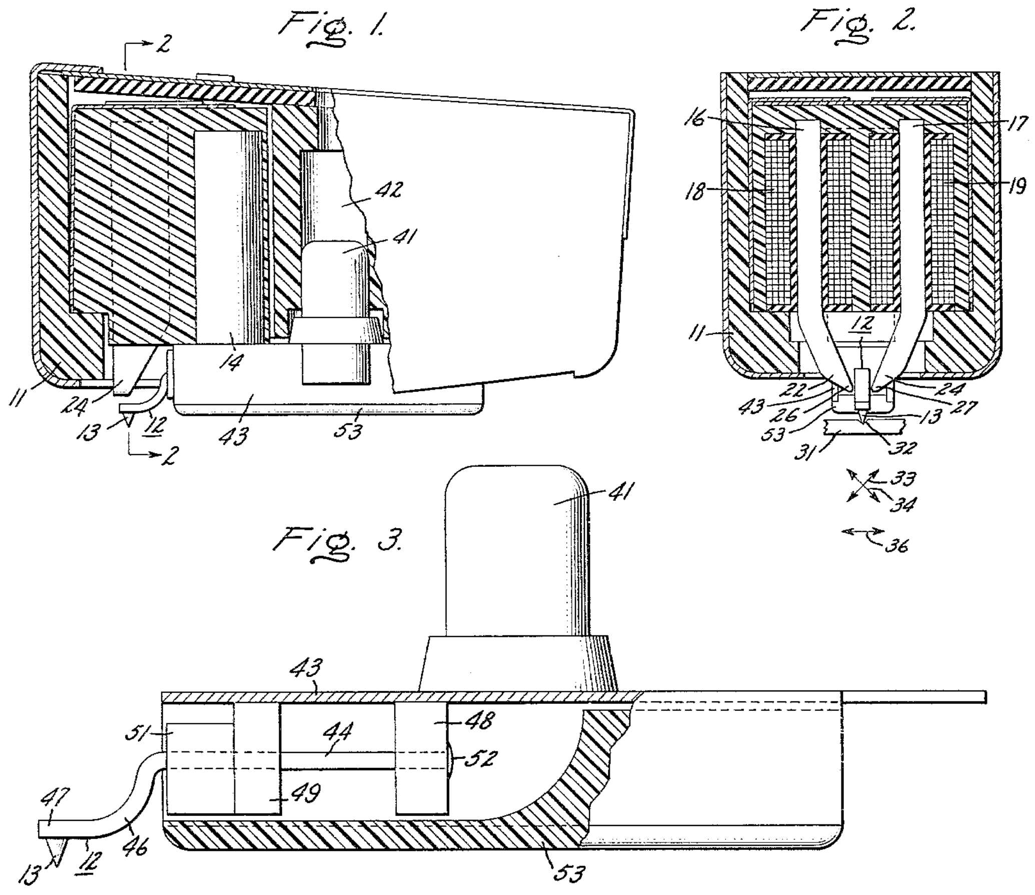
FIG. 1 is a side view, partially broken away to show interior construction, of a magnetic type of phonograph pickup cartridge embodying a stylus of the present invention.
FIG. 2 is a cross-sectional view of FIG. 1 taken on the line 2—2 thereof.
FIG. 3 is a side view, partially broken away to show interior construction, of a preferred embodiment of a stylus assembly in accordance with the present invention.

Now referring to the drawings, FIGS. 1 and 2 show a pickup cartridge of the magnetic type having a support or body 11 which may be of any suitable non-magnetic material such as molded plastic, and is adapted to be mounted at the end of a phonograph tone arm in any convenient or conventional manner.

The electromagnetic voltage generating system of the pickup cartridge includes an armature 12 made of suitable magnetic material and more fully disclosed hereafter. The forward end of the armature 12 is spaced below the underside of the body 11, and carries a stylus 13 depending downwardly therefrom and having a pointed extremity adapted to engage the recorded groove of a phonograph record. The armature 12 is mounted so that its forward end, which carries the stylus 13, is free to move in any direction, in a reference plane, from a neutral position corresponding to the position of the armature when the stylus is engaged in a record groove at a point of zero signal level, as is more fully disclosed hereafter. The aforesaid reference plane is indicated by the line 2—2 of FIG. 1, and may be defined as a plane approximately coincident with the plane that is normal to the tangent of the record sound groove path at the point of engagement of the stylus therewith. However, as will be recognized by those skilled in the art, the exact position or angle of this reference plane may be permitted to vary slightly.

Fixedly supported on or in the body 11 above the rearward portion of the armature 12, is a permanent magnet 14 shown as having a generally cylindrical shape and disposed with its poles spaced along a generally upright or vertically extending axis. A pair of cores 16, 17 of ferromagnetic material (which may be laminated if desired) is arranged forwardly of the permanent magnet 14, the cores 16, 17 being arranged symmetrically with respect to the magnet 14 and the neutral position of the armature 12. Coils or solenoid windings 18, 19 are provided, respectivley, on the cores 16 and 17, the ends of the coils 18, 19 being connected by means of lead wires (not shown) to terminals (not shown) on the body 11.

The lower ends of the cores 18, 19 are shaped to provide pole pieces 22, 24 which project slightly below the under-side of the body 11, the ends of these pole pieces being symmetrically disposed, in the aforesaid reference plane, with respect to the neutral position of the stylus carrying portion of the armature 12. As shown in FIG. 2, the lower ends of the pole pieces 22, 24 are shaped to provide tips or edges 26 and 27 which are spaced apart to provide a gap therebetween. The gap may be an air gap, or may contain non-magnetic material.

The magnet 14, the armature 12, and the cores 16 and 17 along with the associated pole pieces 22 and 24, form a magnetic circuit in which (with suitable magnetic polarization of the magnet 14) magnet flux generated by the magnet 14 extends downwardly from the bottom end thereof, through space to the armature 12, and lengthwise through the armature 12 to the forward end thereof at which the stylus 13 is located. The magnetic flux then separates into two portions, one portion going through space to the pole piece 22 at the region of the tip 26 thereof, and continuing upwardly through the core 16 to the top end thereof and through space to the top end of the magnet 14. Another portion of the magnetic flux from the forward end of the armature 12 extends through space to the pole piece 24 at the region of the tip 27 thereof, then extends upwardly through the core 17 to the upper end thereof, and then extends through space to the upper end of the magnet 14. Of course, an opposite polarization of the magnet 14 will cause the aforesaid directions of magnetic flux to be reversed; the functioning will be the same regardless of the polarization of the magnet 14.

In effect, two parallel magnetic circuits are provided through the cores 16 and 17. A change in the magnetic reluctance of the path of the magnetic flux through either or both of the cores 16 and 17, will cause generation of electrical signals in either or both of the coils 18 and 19, in a well known manner. Movement of the armature 12, caused by the stylus 13 being in engagement with the modulated groove of a phonograph record, will cause a change in reluctance of the magnetic path of one or both of the cores 16 and 17 and their associated pole pieces 22, 24.

More specifically, and referring to FIG. 2 of the drawing, the phonograph record 31 to be played has a groove 32 thereof modulated in accordance with a pair of stereophonic signals, in the well known manner in which the side walls of the groove are perpendicular to one another and each is at a 45° angle with respect to the horizontal plane of the record 31 when in playing position. One wall of the groove contains modulation in accordance with one channel of a stereophonic signal and the other side wall of the groove 32 is modulated in accordance with the other channel of a stereophonic signal. The modulation of the left hand side wall of the groove 32, as viewed in FIG. 2, causes the forward portion of the armature 12 to vibrate in a direction indicated by the double arrow 33, thereby causing corresponding changes in the magnetic flux in the core 17 and causing the generation of a corresponding electrical signal in the coil 19, while at the same time having substantially no effect on the magnetic flux in the core 16. Similarly, the modulation in the right-hand side wall of the record groove 32 as viewed in FIG. 2, causes the forward end of the armature 12 to vibrate in a 45° direction, as indicated by the double arrow 34, which is oriented perpendicularly with respect to the direction indicated by the double arrow 33, this vibration in the direction of the double arrow 34 affecting the magnetic flux in the core 16 and thereby causing a corresponding electrical signal to be generated in the coil 18, while at the same time having substantially no effect on the magnetic flux in the core 17. Thus, two independent output electrical signals are generated in the coils 18 and 19 in accordance with the respective modulations of the two side walls of the record groove 32. These signals may be amplified by a stereophonic amplifier and then fed to loudspeakers.

If desired, the phonograph record 31 may be a monaural type, in which case the armature coil will be vibrated back and forth in a horizontal direction by the recorded modulation of the groove 32, as indicated by the horizontal double arrow 36. This horizontal vibration of the armature 12 will cause equal signals, of opposite polarity, to be generated in the coils 18 and 19, because the horizontal movement of the armature 12 will cause equal magnitude, but opposite polarity, changes of reluctance in the magnetic circuits of the cores 16 and 17. The signals thus generated in the coils 18 and 19, can be combined in an additive manner to provide a single monaural output signal.

It is readily apparent that the armature 12 and its associated mounting structure must be carefully designed, taking into account numerous critical and complex factors, in order to insure proper operation.

Figure 4:
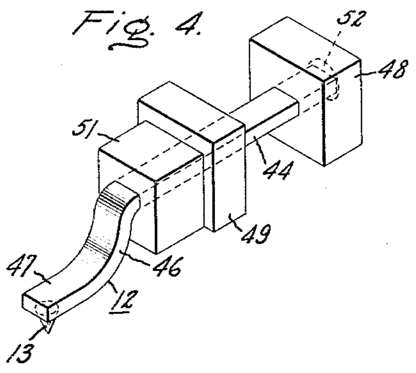
FIG. 4 is a perspective view of a portion of the stylus assembly of the invention.

Now referring to FIGS. 3 and 4, which show details of a preferred embodiment of a stylus assembly in accordance with the present invention, the stylus assembly comprises a vertically extending post 41 adapted to be plugged into an opening 42 in the body 11 so as to be removably retained thereby. A channel shaped member 43 is attached to the lower end of the post 41, this channel member 43 preferably being open at the bottom side thereof. The channel member 43 is made of a non-magnetic metal such as brass. The armature 12, made of magnetically conductive metal such as iron, is crank-shaped so as to have an elongated arm 44, a crank portion 46 extending in a lateral direction from the forward end of the elongated arm 44, and an end portion 47 extending forwardly from the crank portion 46 as shown, the stylus point 13 being attached to and extending laterally from the end portion 47. The armature 12 preferably has a rectangular cross-sectional shape.

A rear support block 48 is positioned in, and held by, the channel member 43, and preferably is in engagement with the top and two sides of the channel member 43. A front support block 49 is positioned in, and held by the channel member 43, at a point forwardly of the block 48 and preferably is in engagement with the top and two sides of the channel member 43. The support blocks 48 and 49 may be held within the channel member 43 by means of adhesive, or by a force fit. The elongated arm 44 of the armature 12 extends through openings in the support blocks 48 and 49, these openings being substantially in alignment on an axis of the channel member 43. If desired, the armature 12 need extend only partially through the rear block 48.

The front support block 49 is provided with a shoulder 51 extending forwardly thereof. The shoulder 51 is spaced from and free from engagement with the channel member 43, and surrounds and is in engagement with the forward portion of the elongated arm 44. The front support block 49 may be a single member shaped to provide the shoulder 51, or the shoulder 51 may comprise an additional and separate block provided with an opening through which the elongated arm 44 passes. The armature 12 may be provided with an enlargement 52 at its rear end. This enlargement 52 and the crank arm 46, prevent the armature 12 from being pulled out of the blocks 48, 49.

The support blocks 48 and 49, and the shoulder 51, are made from resilient material, such as rubber. However, for best functioning of the stylus assembly, the materials of which the support blocks 48 and 49 are made are different and have different properties. The rearmost block 48 preferably is made of a material that is relatively spring-like as compared to the material of which the front block 49 is made. A suitable material for the rear support block 48 is natural gum rubber. The front block, 49, on the other hand, preferably is made from a material that is relatively viscous as compared with the material of the rear block. A suitable material for the front support block 49 is butyl rubber. If the shoulder 51 is a separate piece from the block 49, it should be made from a material the same as, or similar to that of the block 49. A cover piece 53, which may be made of plastic material, is fitted to the bottom, or open side, of the channel member 43 for the purpose of protecting the assembly contained therein.

It has been found that the stylus assembly of the invention as described above, functions exceedingly well and meets the desired objective of high compliance, high fidelity, good stability, and a high degree of separation between stereophonic signals when used for playing a stereophonic phonograph record. Additionally, the stylus assembly is simple and economical to manufacture.

The reasons whereby the stylus assembly structure of the invention achieves the desired objectives, are believed to be as follows: The two support blocks 48 and 49 hold the armature 12 in place with respect to the channel 43, and maintain the armature 12 properly oriented with respect to its rest or neutral position. The two support blocks 48 and 49 function to provide a pivot point about which the armature 12 moves when vibrated by a record groove. In reality, the movement of the armature 12 is complex, and the pivot point for its vertical movement may be different from the pivot point for its horizontal movement. Also, the front portion 47 of the armature 12 rotates slightly about the axis of the elongated arm 44 when vibrated horizontally.

The spring-like quality of the rear support block 48 functions appreciably in maintaining the armature 12 properly oriented with respect to its neutral position, and returns the armature 12 to its neutral position in the absence of vibratory modulations in the record groove which is being played. The front damping block 49, being of a relatively viscous material which is capable of being moved by the vibrations of the armature 12 but which absorbs energy in the process of being moved, performs the function of damping the vibrations of the armature to the extent necessary to prevent the armature 12 from vibrating excessively. The shoulder 51 of the front support block 49 contributes to the aforesaid damping function, especially at the higher audio frequencies of 10,000 cycles per second and higher. The front support block 49 functions, along with its damping function, to prevent the armature 12 from vibrating resonantly in accordance with its inherent self-resonant frequencies, these self-resonant frequencies generally being in the upper audio frequency range. The shoulder 51, by being spaced from and free of contact with the channel member 43, permits the armature 12 to have a desired degree of compliance in its directions of vibration, this compliance being primarily determined by the portion of the front support block 49 which is in engagement with the channel member 43. Additional resilient blocks could be provided between the blocks 48 and 49, but the two blocks 48 and 49 are adequate and preferred.

While a preferred embodiment of the invention has been shown and described, other embodiments and modifications therein will be apparent to those skilled in the art, and will fall within the scope of invention as defined in the following claims:

What I claim is:

1. A stylus assembly comprising two blocks of resilient material, means for positioning said blocks in spaced apart relationship along an axis, an elongated armature positioned to extend through said blocks with the forward end of the armature extending frontwardly from the frontmost block, and a playback stylus attached to and extending laterally from said armature at said forward end thereof, said frontmost block being provided with a unitary shoulder extending frontwardly thereof and being in contact with and surrounding said armature, said shoulder being spaced from and free of contact with said positioning means.

2. A stylus assembly comprising a channel member of non-magnetic material, a mounting post attached to said channel member and extending laterally therefrom, two blocks of resilient material contained in and held by said channel member, said blocks being substantially aligned on the axis of said channel member, an elongated armature of magnetic material positioned to extend through said blocks with the forward end of the armature extending frontwardly from the frontmost block, and a playback stylus attached to and extending laterally from said armature at said forward end thereof, said frontmost block being provided with a unitary shoulder extending frontwardly thereof spaced from and free from contact with said channel member and being in contact with and surrounding said armature.

3. A stylus assembly comprising a channel member of non-magnetic material, a mounting post attached to said channel member and extending laterally therefrom, two blocks of resilient material contained in and held by said channel member, said blocks being substantially aligned on the axis of said channel member, and a crank-shaped armature of magnetic material having an elongated arm positioned substantially on said axis and extending through said blocks, said crank-shaped armature having a crank portion extending substantially laterally from the front end of said elongated arm in a direction away from said mounting post and having a frontwardly extending end portion provided with a playback stylus extending laterally therefrom in a direction away from said mounting post, the frontmost block being provided with a unitary shoulder extending frontwardly thereof spaced from and free from contact with said channel member and being in contact with and surrounding said elongated arm.

4. A stylus assembly comprising at least two blocks of resilient material, means for holding said blocks in spaced apart relationship along an axis, an elongated armature positioned to extend through the frontmost block and at least partially through the rearmost of said blocks, a portion of said armature extending forwardly from the frontmost block, said frontmost block being provided with a forwardly extending unitary shoulder spaced from and free of contact with said holding means and being in contact with and surrounding said armature, and a playback stylus attached to and extending laterally from said forwardly extending portion of the armature.

5. A stylus assembly comprising an elongated armature, a stylus attached to and extending laterally from said armature at an end thereof, and at least two blocks of resilient material arranged to support said armature along the length thereof, the block nearest said stylus being made from a material that is relatively more viscous than the material of the block farthest from said stylus, and said block that is farthest from said stylus being made from a material that is relatively more spring-like than the material of said block that is nearest said stylus.

6. A stylus assembly comprising two blocks of resilient material, means for positioning said blocks in spaced apart relationship along an axis, an elongated armature positioned to extend through said blocks with the forward end of the armature extending frontwardly from the frontmost block, said frontmost block being made from a material that is relatively more viscous than the material of the rearmost block, and said rearmost block being made from a material that is relatively more spring-like than the material of said frontmost block, and a stylus attached to and extending laterally from said armature at said forward end thereof, said frontmost block being provided with a shoulder extending frontwardly thereof and being in contact with and surrounding said armature, said shoulder being spaced from and free of contact with said positioning means.

7. A stylus assembly in accordance with claim 6, in which said frontmost block is made from butyl rubber and in which said rearmost block is made from natural gum rubber.

8. A stylus assembly comprising a channel member of non-magnetic material, a mounting post attached to said channel member and extending laterally therefrom, two blocks of resilient material contained in and held by said channel member, said frontmost block being made from a material that is relatively more viscous than the material of the rearmost block, and said rearmost block being made from a material that is relatively more spring-like than the material of said frontmost block, said blocks being substantially aligned on the axis of said channel member, an elongated armature of magnetic material positioned to extend through said blocks with the forward end of the armature extending frontwardly from the frontmost block, and a stylus attached to and extending laterally from said armature at said forward end thereof, said frontmost block being provided with a shoulder extending frontwardly thereof spaced from and free from contact with said channel member and being in contact with and surrounding said armature.

9. A stylus assembly in accordance with claim 8, which said frontmost block is made from butyl rubber and in which said rearmost block is made from natural gum rubber.

References Cited by the Examiner

UNITED STATES PATENTS

| | | | |
|---|---|---|---|
| 2,332,204 | 10/1943 | Chorpening | 179—100.41 |
| 2,494,438 | 1/1950 | Gilbert | 179—100.41 |
| 2,776,342 | 1/1957 | Dally | 274—37 |
| 2,803,713 | 8/1957 | Miller | 179—100.41 |
| 2,937,243 | 5/1960 | Pritchard | 274—37 |

IRVING L. SRAGOW, *Primary Examiner.*

JOHN P. WILDMAN, STEPHEN W. CAPELLI, *Examiners.*